United States Patent
Terasaki et al.

(10) Patent No.: US 7,837,963 B2
(45) Date of Patent: Nov. 23, 2010

(54) METHOD FOR REMOVING LEAD FROM CEMENT BURNING FURNACE

(75) Inventors: Junichi Terasaki, Kumagaya (JP); Hajime Wada, Kumagaya (JP); Takahiro Hayashida, Sakura (JP); Soichiro Okamura, Kumagaya (JP)

(73) Assignee: Taiheiyo Cement Corporation, Tokyo (JP)

( * ) Notice: Subject to any disclaimer, the term of this patent is extended or adjusted under 35 U.S.C. 154(b) by 0 days.

(21) Appl. No.: 12/446,966

(22) PCT Filed: Oct. 19, 2007

(86) PCT No.: PCT/JP2007/070401
§ 371 (c)(1), (2), (4) Date: Jul. 21, 2009

(87) PCT Pub. No.: WO2008/050678
PCT Pub. Date: May 2, 2008

(65) Prior Publication Data
US 2009/0304565 A1    Dec. 10, 2009

(30) Foreign Application Priority Data
Oct. 24, 2006    (JP)    ............................. 2006-288848

(51) Int. Cl.
*B01D 53/64*    (2006.01)
(52) U.S. Cl. .................... 423/210; 423/215.5; 106/741; 106/751; 106/761; 106/762
(58) Field of Classification Search ................ 423/210; 106/741, 751, 761, 762
See application file for complete search history.

(56) References Cited

U.S. PATENT DOCUMENTS 4,333,766 A * 6/1982 Moisset et al. ............. 106/746
4,560,412 A * 12/1985 Weber ........................ 106/741

(Continued)

FOREIGN PATENT DOCUMENTS

EP    1219336    7/2002

(Continued)

OTHER PUBLICATIONS

Toshiaki Murata, "Coal Preparation Technology for Moderation of Environmental Pollution," Journal "Doryoku (Power)" No. 248 extra issue, 1998.

(Continued)

*Primary Examiner*—Timothy C Vanoy
(74) *Attorney, Agent, or Firm*—Stetina Brunda Garred & Brucker

(57) ABSTRACT

A method to efficiently reduce lead content of cement without exerting influence upon quality of the cement. The method comprises the steps of: controlling O2 concentration of combustion gas in an inlet end of a cement kiln to 5% or lower and/or CO concentration thereof 1000 ppm or more; extracting a part of combustion gas from the cement kiln and collecting dust contained in the combustion gas; and collecting lead from the dust collected. With this, the area where raw material temperature in the cement kiln is between 800° and 1100° can be turned into reducing atmosphere to sharply increase volatilization rate of lead, and collection of lead from the dust allows lead content of cement to efficiently be reduced without exerting influence upon quality of the cement.

7 Claims, 4 Drawing Sheets (a)

(b)

(c)

(d)

U.S. PATENT DOCUMENTS 4,840,671 A * 6/1989 Lynn et al. ............... 106/705
5,219,544 A * 6/1993 Kupper et al. ............ 423/239.1

FOREIGN PATENT DOCUMENTS

| | | |
|---|---|---|
| JP | 5344472 | 4/1978 |
| JP | 5386720 | 7/1978 |
| JP | 61025651 A | 2/1986 |
| JP | 61103992 A | 5/1986 |
| JP | 61106698 A | 5/1986 |
| JP | 2116649 | 5/1990 |
| JP | 3221147 | 9/1991 |
| JP | 5238788 | 9/1993 |
| JP | 5293385 | 11/1993 |
| JP | 6157089 | 6/1994 |
| JP | 6335700 | 6/1994 |
| JP | 06063335 | 8/1994 |
| JP | 775720 | 3/1995 |
| JP | 7204604 | 8/1995 |
| JP | 7213950 | 9/1995 |
| JP | 7299331 | 11/1995 |
| JP | 08057351 A | 3/1996 |
| JP | 8108038 | 4/1996 |
| JP | 09225441 A | 9/1997 |
| JP | 9227184 | 9/1997 |
| JP | 09295841 | 11/1997 |
| JP | 9301751 | 11/1997 |
| JP | 10230137 | 9/1998 |
| JP | 11010131 | 1/1999 |
| JP | 11100243 | 4/1999 |
| JP | 11244826 | 9/1999 |
| JP | 11347548 | 12/1999 |
| JP | 200024625 | 1/2000 |
| JP | 2000146458 | 5/2000 |
| JP | 2001198434 | 7/2001 |
| JP | 2002180146 | 6/2002 |
| JP | 2002219335 | 8/2002 |
| JP | 2002282639 | 10/2002 |
| JP | 2002355531 | 12/2002 |
| JP | 2003055010 A * | 2/2003 |
| JP | 2003145095 A * | 5/2003 |
| JP | 2003266057 A | 9/2003 |
| JP | 2003284973 A | 10/2003 |
| JP | 2004313833 A | 11/2004 |
| JP | 2005029836 A * | 2/2005 |
| JP | 2005104792 | 4/2005 |
| JP | 2005313009 | 10/2005 |
| JP | 2008143728 | 6/2008 |
| WO | WO2004/052801 | 6/2004 |

OTHER PUBLICATIONS

Mitsui Engineering & Shipbuilding Co., Ltd., "De-Ashing and De-Sulfurizing Equipment Based on M-COL Technology," Journal, No. 154, 1995.

Mitsui Engineering & Shipbuilding Co., Ltd., "Fine M-COL," Journal, No. 170, 2000.

Mitsui Engineering & Shipbuilding Co., Ltd., "Development of Clean Coal Fuel (M-COL) System," Journal, No. 171, 2000.

Nishitani, Takashi, "A Basic Experiment on the Mercury Removal in Exhaust Gases from Municipal Refuse Incinerator," Osaka City Institute of Public Health and Environmental Sciences, Annual Report No. 51, 1988.

* cited by examiner

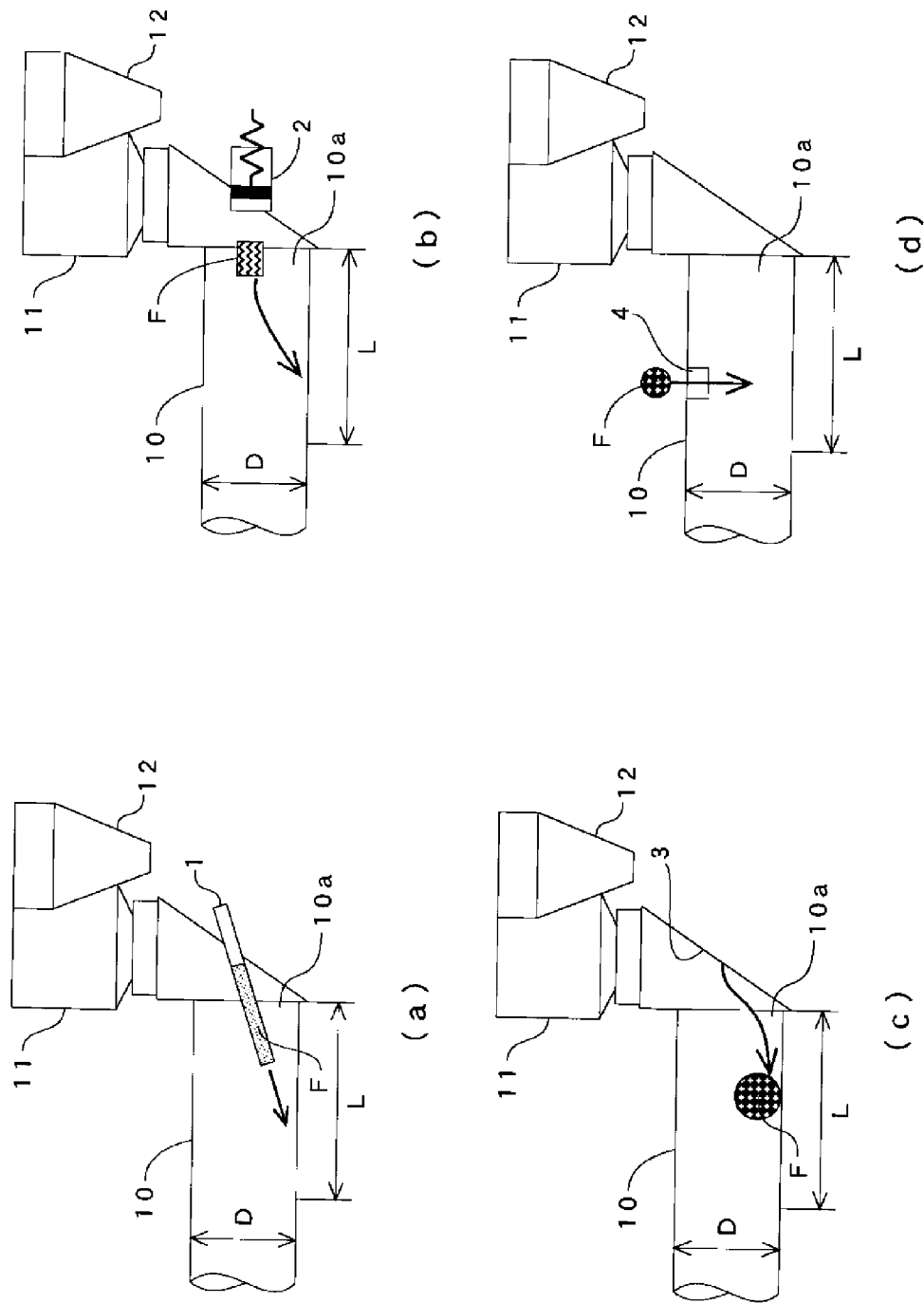
[FIG. 1]

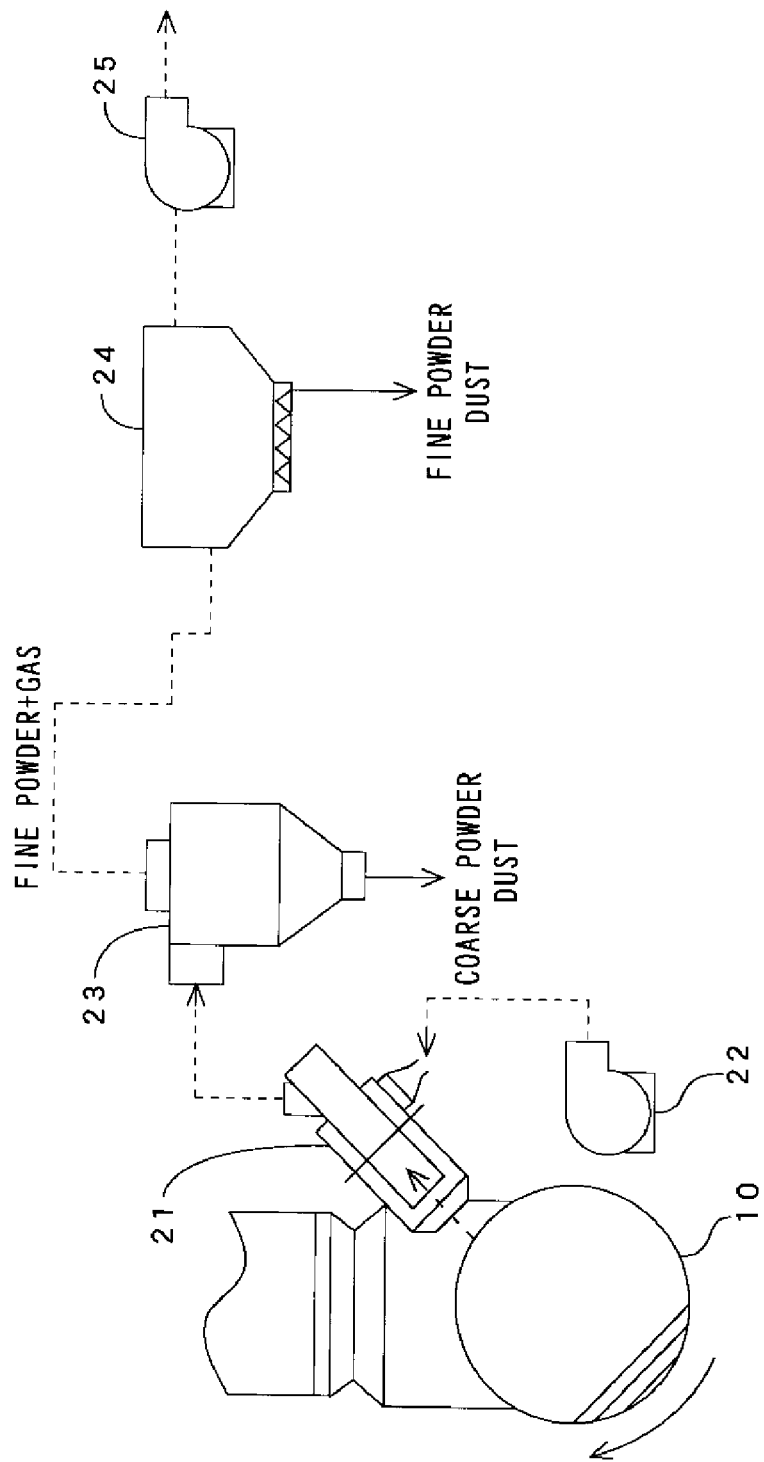
[FIG. 2]

[FIG. 3]
(a) 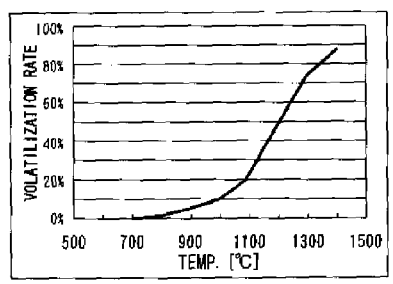
(b) 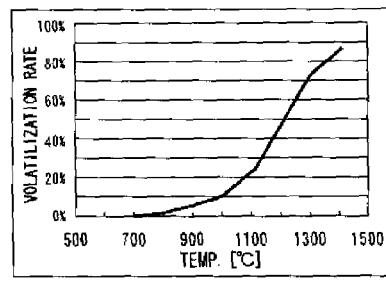
(c) 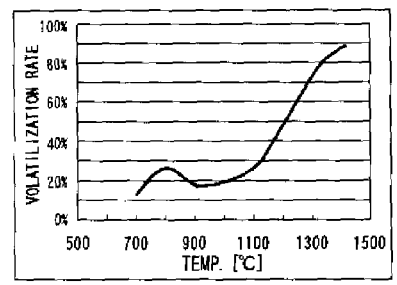
(d) 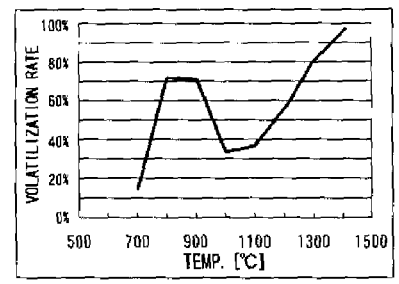
(e) 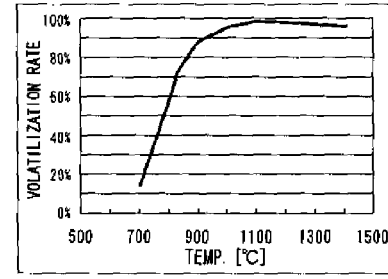

[FIG. 4]
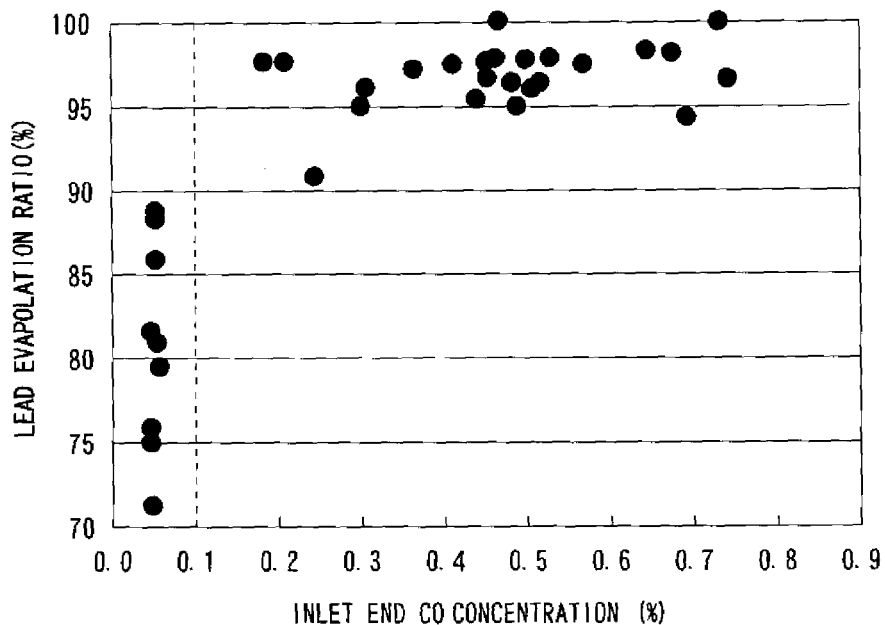
[FIG. 5]
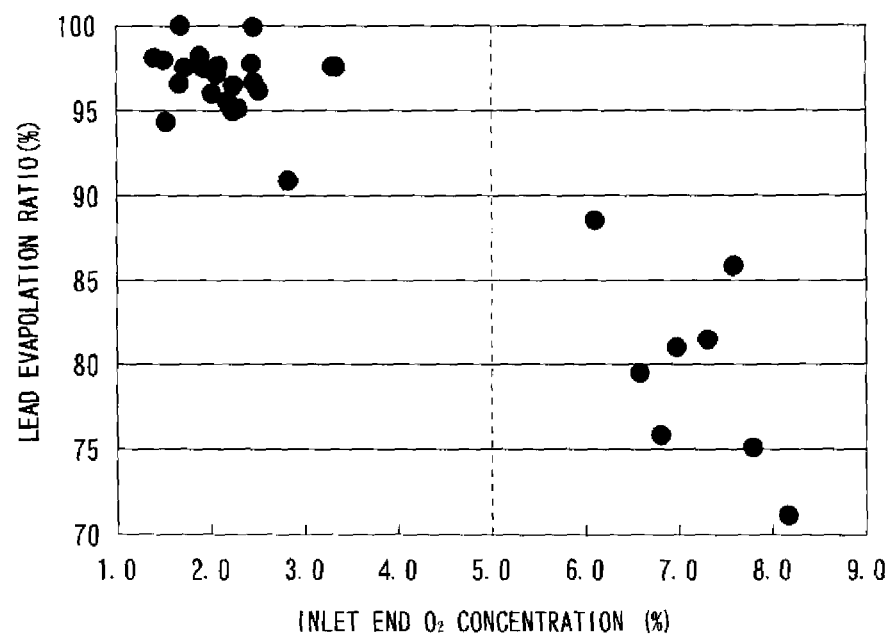

METHOD FOR REMOVING LEAD FROM CEMENT BURNING FURNACE

CROSS-REFERENCE TO RELATED APPLICATIONS

The present application claims priority to International Application No. PCT/JP2007/070401 which was filed on Oct. 19, 2007 and claims priority to Japanese Patent Application No. 2006-288848 filed on Oct. 24, 2006.

STATEMENT RE: FEDERALLY SPONSORED RESEARCH/DEVELOPMENT

Not Applicable

BACKGROUND OF THE INVENTION

1. Technical Field of the Invention

The present invention relates to a method for removing lead from a cement burning furnace, and more particularly to a method for removing lead from a cement burning furnace by collecting lead from dust contained in a part of combustion gas that is extracted from a kiln exhaust gas passage running from the inlet end of the cement kiln to a bottom cyclone.

2. Description of the Related Art

It has been considered that since lead (Pb) contained in cement is immobilized, the lead does not elute to soil. However, with increased amounts of recycled resources utilized in a cement manufacturing device in recent years, lead contained in cement has been increasing to the extent that the content sharply exceeds the record in the past. Since there is a possibility that the lead elutes to soil due to the increased concentration, lead content of cement is required to be reduced to the previous record.

In order to reduce lead content of cement, for example, a method of treating waste is described in the first patent document. The method comprises the processes of: a washing process for washing waste; an alkali-eluting process for solid phase separated; a deleadification process for separating lead from the filtrate through precipitation; a decalciumization process for separating calcium through precipitation from the filtrate from which the lead is removed; and salt collecting process for separating and collecting salt by heating the filtrate through separation, to effectively separate and remove chlorine and lead in waste that is fed to a cement manufacturing process.

In addition, a method of treating waste is described in the second patent document. The method comprises the steps of: mixing waste with a solution containing calcium ion to produce slurry; solid-liquid separating the slurry to generate solid phase containing zinc and water solution containing lead; adding sulfurization agent to the water solution containing lead; and solid-liquid separating the water solution to produce lead sulfide and solution containing calcium ion, to separated and remove lead and the like from waste such as fly ash.

Patent document 1: Japanese Patent Publication No. 2003-1218 gazette

Patent document 2: Japanese Patent Publication No. 2003-201524 gazette

BRIEF SUMMARY OF THE INVENTION

Although, in the conventional art described in the above-mentioned patent documents, to reduce lead content, lead contained in the chlorine bypass dust, which is recovered from a part of combustion gas that is extracted from a kiln exhaust gas passage from an inlet end of a cement kiln and a bottom cyclone, is removed the ration of the lead, which is removed from the chlorine bypass dust and is discharged to the outside of the system, to total lead is only approximately 30%, so that even if lead contained in the chlorine bypass dust would completely be removed, remaining approximately 70% of lead would still be taken in clinker that is discharged from the cement kiln, therefore, it is not easy to reduce lead content of cement. Therefore, it is important to increase lead concentration of chlorine bypass dust and the like by accelerating lead volatilization in the cement kiln.

Chloridization-volatilization method and reduction-volatilization method are known as technology for lead volatilization. However, when generally performed chloridization-volatilization method is applied to a cement burning process, it is necessary to feed by far much amount of chlorine than practical amount in cement manufacturing. On the other hand, applying reduction-volatilization method causes color of the cement produced to be yellow-ish, resulting in a problem in quality of the cement.

The present invention has been made in consideration of the above-problems in the conventional art, and the object thereof is to provide a method for efficiently reducing lead content of cement by increasing lead concentration to the chlorine bypass dust and others.

To achieve the above object, a method for removing lead from a cement burning furnace according to the present invention is characterized by comprising the steps of: controlling $O_2$ concentration of combustion gas in an inlet end of a cement kiln to 5% or lower and/or CO concentration thereof 1000 ppm or more; extracting a part of combustion gas; and collecting lead from the dust collected.

With the present invention, it becomes possible to sharply increase lead volatilization rate by generating reduction atmosphere in the area where temperature of raw material in a cement kiln is between 800° C. and 1100° C., which is near the inlet end of the cement kiln. As a result, extracting a part of cement kiln combustion gas and collecting lead from dust that is collected from the combustion gas allows lead content of cement to efficiently be reduced. In addition, this method has no effect on the quality of the cement.

In the method for removing lead from a cement burning furnace described above, while controlling $O_2$ concentration of the combustion gas in the inlet end of the cement kiln 5% or lower and/or CO concentration thereof 1000 ppm or more, fuel and/or raw material including inflammable material can be fed to an area where L/D of the cement kiln is 0 or more and 12 or less, where an inner diameter of the cement kiln is D and a distance from the inlet end of the cement kiln longitudinally into the kiln is L. With this, it is possible to securely maintain reduction atmosphere in the area where temperature of raw material in a cement kiln is between 800° C. and 1100° C., which allows lead content of cement to further efficiently be reduced.

In the above method for removing lead from a cement burning furnace, powdery and/or slurry fuel and/or raw material including inflammable material may be injected with a nozzle to the area where L/D of the cement kiln is 0 or more and 12 or less.

Further, lump fuel and/or raw material including inflammable material can be fed with a long distance thrower to the area where L/D of the cement kiln is 0 or more and 12 or less.

Still further, it is possible to cylindrical or globular fuel and/or raw material including inflammable material is fed by utilizing an inclined surface of the inlet end of the cement kiln to the area where L/D of the cement kiln is 0 or more and 12 or less, and the cylindrical or globular fuel and/or raw material including inflammable material may be formed from small pieces of fuel and/or raw material including inflammable material.

The fuel and/or raw material including inflammable material can be fed from a port installed in the area where L/D of the cement kiln is 0 or more and 12 or less.

As mentioned above, with the method for removing lead from cement burning furnace according to the present invention, it becomes possible to efficiently reduce lead content of cement without effect on the quality of the cement.

BRIEF DESCRIPTION OF THE DRAWINGS

FIGS. 1(a), 1(b), 1(c) and 1(d) are diagrammatical views exemplarily showing devices to carry out a method for removing lead from a cement burning furnace according to first, second, third and fourth embodiments of the present invention, respectively;

FIG. 2 is a flow chart showing overall construction of a chlorine bypass system attached to a cement burning furnace;

FIGS. 3(a), 3(b), 3(c), 3(d) and 3(e) are a series of graphs showing the relation between gas temperature and lead volatilization rate calculated by chemical equilibrium simulation;

FIG. 4 is a graph showing the relation between inlet end CO concentration of a cement kiln and lead volatilization rate; and FIG. 5 is a is a graph showing the relation between inlet end $O_2$ concentration of a cement kiln and lead volatilization rate.

DETAILED DESCRIPTION OF THE INVENTION

Next, embodiments of the present invention will be explained with reference to figures.

FIG. 1(a) shows an example of a device to carry out a method for removing lead from a cement burning furnace according to the first embodiment of the present invention, this device is provided with nozzle 1, at an inlet end 10a (at the end to which a calciner 11 and a bottom cyclone 12 are installed) of a cement kiln 10, for injecting raw material including powdery and/or slurry fuel and/or raw material including inflammable material hereinafter referred to as "fuels" according to circumstances) into the cement kiln 10.

The nozzle 1 is provided with a feeder not shown for feeding fuels F and an injector for injecting fuels F, which is fed to the nozzle 1, into the cement kiln 10. With this, fuels F can deeply be injected into the cement kiln 10.

The nozzle 1 is provided with a feeder not shown for feeding fuels F and an injector for injecting fuels F, which is fed to the nozzle 1, into the cement kiln 10. With this, the fuels F can deeply be injected into the cement kiln 10.

Meanwhile, as illustrated in FIG. 2, the cement kiln 10 is provided with a chlorine bypass system, and gas extracted from a kiln exhaust gas passage, which runs from the inlet end of the cement kiln 10 to the bottom cyclone is cooled with cooling air from a cooling fan 22 in a probe 21, and is introduced to a cyclone 23 so as to be divided into coarse powder dust, and fine powder and gas. The course powder dust is returned to a cement kiln system, and fine powder (chlorine bypass dust) including potassium chloride (KCl) and the like is collected by a dust collector 24. Meanwhile, gas exhausted from the dust collector 24 is released to the atmosphere via an exhaust fan 25.

Next, the method for removing lead from a cement burning furnace according to the present invention with the system described above will be explained.

In FIG. 1(a), powdery or slurry fuel and/or raw material including inflammable material is injected into the cement kiln 10 with the nozzle 1. Here, as fuels, besides fine coal and heavy oil, which are generally used as main fuels for the cement kiln 10, various kinds of material such as waste fuels may be utilized. Further, as for raw material including inflammable material also, kinds of material are not limited, and recycled waste may be used. But, when fuels with much volatile matter are used, even if gas with strong reducing effect was generated, the gas would instantly flow downstream and was replaced with gas with oxidizing effect, so that fuels with much fixed carbon are preferably used.

With the nozzle 1, the fuels F are injected to the area where L/D of the cement kiln 10 is 0 or more and 12 or less, where the inner diameter of the cement kiln is D and the distance from the inlet end 10a of the cement kiln 10 longitudinally into the kiln 10 is L.

FIGS. 3(a) to (e) show the relation between gas temperature and lead volatilization rate by chemical equilibrium simulation, the axis of abscissas shows gas temperature and the axis of ordinates shows lead volatilization rate. Further, in the FIGS. 3(a) to (e), (a) shows moist air atmosphere, (b) standard combustion gas atmosphere, (c) no oxygen atmosphere, (d) low CO concentration atmosphere and (e) high CO concentration atmosphere, from (a) to (e), atmosphere gradually changes from oxidizing atmosphere to reducing atmosphere, and (e) shows the strongest reducing atmosphere.

As clearly shown n FIG. 3, under the strong reducing atmosphere (e), lead volatilization rate sharply rises in the area where gas temperature is between 700° C. and 1200° C. in comparison with other cases. The above temperature area corresponds to the area near the inlet end 10a of the cement kiln 10. Therefore, to the area where L/D of the cement kiln 10 is 0 or more and 12 or less, that is, to the area where raw material temperature in the cement kiln 10 is between 800° C. and 1100° C., powdery or slurry fuels F are injected to change this area to reducing atmosphere, which allows lead volatilization rate to considerably be increased.

FIG. 4 gives examination data showing the relation between CO concentration in the inlet end 10a of the cement kiln 10 (hereinafter referred to as "inlet end CO concentration") and lead volatilization rate. When the inlet end CO concentration becomes 0.1% (1000 ppm) or more, the lead volatilization rate becomes approximately 90% or more, and when the inlet end CO concentration becomes 0.3% (3000 ppm) or more, the lead volatilization rate becomes approximately 95% or more. With this, it is substantiated that under strong reducing atmosphere lead volatilization rate considerably rises in the area near the inlet end 10a of the cement kiln 10 shown in FIG. 1.

In addition, FIG. 5 gives examination data showing the relation between $O_2$ concentration in the inlet end 10a of the cement kiln 10 (hereinafter referred to as "inlet end $O_2$ concentration") and lead volatilization rate. When the inlet end $O_2$ concentration becomes 5% or less, the lead volatilization rate becomes approximately 90% or more, and when the inlet end $O_2$ concentration becomes 3% or less, the lead volatilization rate becomes approximately 95% or more. With this also, it is substantiated under strong reducing atmosphere lead volatilization rate considerably rises in the area near the inlet end 10a of the cement kiln 10 shown in the FIG. 1.

Lead volatized in the cement kiln 10 is, in FIG. 2, included in the gas extracted by the probe 21; the extracted gas is cooled in the probe 21; the extracted gas is introduced to the cyclone 23 and is separated into coarse powder dust, and fine powder and gas; and the fine powder is collected by the dust collector 24. Since to the fine powder is concentrated much lead in comparison to conventional one as much lead is volatilized in the cement kiln 10, lead content of the cement manufactured by the cement kiln 10 can be reduced by collecting the lead.

FIG. 1(b) shows an example of a device to carry out a method for removing lead from a cement burning furnace according to the second embodiment of the present invention, this device is provided with a long distance thrower 2, at the inlet end 10a of the cement kiln 10, for feeding lump fuels F into the cement kiln 10. The long distance thrower 2 adopts elastic body, air pressure, oil pressure or the like as motive energy, and is constructed in such a manner that the fuels F supplied to the nozzle 1 are deeply fed into the cement kiln 10.

With this long distance thrower 2 and so on, the fuels F are fed to the area where L/D of the cement kiln 10 is 0 or more and 12 or less, and like the first embodiment, the area where raw material temperature in the cement kiln 10 is between 800° and 1100° can be turned into reducing atmosphere to considerably increase lead volatilization rate. And, as described above, collecting lead from the chlorine bypass dust to which much lead is concentrated in comparison to conventional one allows lead content of the cement manufactured by the cement kiln 10 to be reduced.

Meanwhile, in this embodiment, condition of the injection such as dimension of the fuels F and initial velocity can be determined by calculation through fluid simulation or the like in consideration of fluid resistance $R=C \cdot A \cdot \rho \cdot u^2/2$, where C: resistance coefficient, A: projected area, $\rho$: density, u: relative velocity. This prevents the fuels F from returning on the kiln inlet 10a side by exhaust gas of the cement kiln 10, which allows the fuels F to securely be fed to the area where L/D of the cement kiln 10 is 0 or more and 12 or less with the long distance thrower 2.

In addition, the position that the long distance thrower 2 is installed also, in order to prevent the returning of the fuels F, is preferably determined on raw material side on rear face of the cement kiln. The exhaust gas of the cement kiln does not uniformly flow in the kiln, but preferentially flows on the other side of raw material with low resistance. Therefore, at the feeding of the fuels F, installing the long distance thrower 2 on raw material side with low resistance prevents the returning of the fuels F.

FIG. 1(c) is for explaining a method for removing lead from a cement burning furnace according to the third embodiment of the present invention. In this embodiment, cylindrical or globular fuels F are fed by utilizing an inclined surface 3 of the inlet end 10a of the cement kiln 10. By utilizing inertia of the cylindrical or globular fuels F rolling on the inclined surface 3, the fuels F are deeply fed to the cement kiln 10.

With the above method also, the fuels F are fed to the area where L/D of the cement kiln 10 is 0 or more and 12 or less, and like the above embodiments, the area where raw material temperature in the cement kiln 10 is between 800° and 1100° can be turned into reducing atmosphere to considerably increase lead volatilization rate, and collecting lead from the chlorine bypass dust to which much lead is concentrated allows lead content of the cement manufactured by the cement kiln 10 to be reduced.

Meanwhile, as for conditions at the feeding of the cylindrical or globular fuels F also, by estimating the position where the fuels F reach based on a vertical position where the fuels F are fed and time for complete burning of the fuels F in an electric furnace or the like that is measured in advance, it becomes possible to more accurately feed the fuels F to a target position in the cement kiln. And, to manufacture cylindrical or globular fuels F, small pieces of fuels may be formed.

FIG. 1(d) shows an example of a device to carry out a method for removing lead from a cement burning furnace according to the fourth embodiment of the present invention, this device is provided with a feeding port 4 installed in the area where L/D of the cement kiln 10 is 0 or more and 12 or less, and a feeder not shown for feeding the fuels F to the feeding port 4. The feeding port 4 is constructed such that the feeding port 4 opens when positioning above the cement kiln 10 only, and material seal or the like is conducted to minimize the quantity of cool air that is taken into the cement kiln 10.

With the feeding port 4 described above, the fuels F are directly fed to the area where L/D of the cement kiln 10 is 0 or more and 12 or less, and like the above embodiments, the area where raw material temperature in the cement kiln 10 can be between 800 and 1100° is turned into reducing atmosphere to considerably increase lead volatilization rate, and collecting lead from the chlorine bypass dust to which much lead is concentrated allows lead content of the cement manufactured by the cement kiln 10 to be reduced.

Meanwhile, in the above embodiments, fuels are fed to the area where L/D of the cement kiln 10 is 0 or more and 12 or less to turn the area where raw material temperature in the cement kiln 10 is between 800° and 1100° into reducing atmosphere. However, without feeding fuels, tuning the above-mentioned area into reducing atmosphere allows lead volatilization rate to considerably be increased. In actual operation of the cement kiln 10, in order to securely maintain reducing atmosphere in the above-mentioned area, it is preferable not only to control O2 concentration of combustion gas in the inlet end of 10a of the cement kiln 10 to 5% or lower and/or CO concentration thereof 1000 ppm or more but to feed fuels in the area where L/D of the cement kiln 10 is 0 or more and 12 or less.

EXPLANATION OF SIGNALS 1 nozzle
2 long distance thrower
3 inclined surface
4 feeding port
10 cement kiln
10a inlet end
11 calciner
12 bottom cyclone
21 probe
22 cooling fan
23 cyclone
24 dust collector
25 exhaust fan

The invention claimed is:

1. A method for removing lead from a cement burning furnace comprising the steps of:
   Controlling an $O_2$ concentration of a combustion gas in an inlet end of a cement kiln to 5% or lower and/or a CO concentration thereof to 1000 ppm or more;
   extracting a part of said combustion gas from the cement kiln and collecting dust contained in said combustion gas; and
   collecting lead from the dust collected from said combustion gas.

2. The method for removing lead from a cement burning furnace as claimed in claim 1, wherein while controlling the $O_2$ concentration of the combustion gas in the inlet end of the cement kiln to 5% or lower and/or the CO concentration thereof to 1000 ppm or more, fuel and/or raw material including inflammable material is fed to an area where an L/D ratio of the cement kiln is 0 or more and 12 or less, where an inner diameter of the cement kiln is D and a distance from the inlet end of the cement kiln longitudinally into the kiln is L.

3. The method for removing lead from a cement burning furnace as claimed in claim 2, wherein powdery and/or slurry fuel and/or raw material including inflammable material is injected with a nozzle to the area where the L/D ratio of the cement kiln is 0 or more and 12 or less.

4. The method for removing lead from a cement burning furnace as claimed in claim 2, wherein lump fuel and/or raw material including inflammable material is fed with a long distance thrower to the area where the L/D ratio of the cement kiln is 0 or more and 12 or less.

5. The method for removing lead from a cement burning furnace as claimed in claim 2, wherein cylindrical or globular fuel and/or raw material including inflammable material is fed by utilizing an inclined surface of the inlet end of the cement kiln to the area where the L/D ratio of the cement kiln is 0 or more and 12 or less.

6. The method for removing lead from a cement burning furnace as claimed in claim 5, wherein said cylindrical or globular fuel and/or raw material including inflammable material is formed from small pieces of fuel and/or raw material including inflammable material.

7. The method for removing lead from a cement burning furnace as claimed in claim 2, wherein said fuel and/or raw material including inflammable material is fed from a port installed in the area where the L/D ratio of the cement kiln is 0 or more and 12 or less.

* * * * *